United States Patent
Primavera et al.

(10) Patent No.: US 12,169,157 B2
(45) Date of Patent: Dec. 17, 2024

(54) PROCESS FOR DETECTING WATER LEAKS FROM SMELTING FURNACES IN METAL OR ALLOY PRODUCTION PLANTS AND RELATED PLANT

(71) Applicant: DANIELI & C. OFFICINE MECCANICHE S.P.A., Buttrio (IT)

(72) Inventors: Alessandra Primavera, Faedis (IT); Stefano Terlicher, Cividale del Friuli (IT); Alessio Milocco, Terzo di Aquileia (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 237 days.

(21) Appl. No.: 17/755,470

(22) PCT Filed: Nov. 5, 2020

(86) PCT No.: PCT/IB2020/060402
§ 371 (c)(1),
(2) Date: Apr. 29, 2022

(87) PCT Pub. No.: WO2021/090222
PCT Pub. Date: May 14, 2021

(65) Prior Publication Data
US 2022/0397476 A1 Dec. 15, 2022

(30) Foreign Application Priority Data
Nov. 6, 2019 (IT) .......................... 102019000020470

(51) Int. Cl.
*G01M 3/20* (2006.01)
*C21B 13/12* (2006.01)
(Continued)

(52) U.S. Cl.
CPC ............. *G01M 3/202* (2013.01); *C21B 13/12* (2013.01); *F27D 9/00* (2013.01); *F27D 21/00* (2013.01);
(Continued)

(58) Field of Classification Search
CPC ........ G01M 3/202; G01M 3/20; G01M 3/205; G01M 3/207; G01M 3/222; G01M 3/223;
(Continued)

(56) References Cited

U.S. PATENT DOCUMENTS

| 5,942,678 A | 8/1999 | Wettstein |
| 6,693,949 B1 * | 2/2004 | Schubert .................. F27B 3/24 |
| | | 373/113 |

(Continued)

FOREIGN PATENT DOCUMENTS

| EP | 0285864 | 10/1988 |
| FR | 2347668 | 2/1984 |

(Continued)

OTHER PUBLICATIONS

Aoki, P. et al. "Water Leak Detection in the Cooling System of the Blast Furnace Walls, by Using Radiotracer Techniques", IV Japan-Brazil Symposium on Science and Technology, vol. IV—Application of Radiation and Radioisotopes. Academia de Ciencias do Estado de S. Paulo, 1984. (Year: 1984).*

(Continued)

*Primary Examiner* — Paul M. West
(74) *Attorney, Agent, or Firm* — Schwegman Lundberg & Woessner, P.A.

(57) ABSTRACT

The invention concerns a process for detecting water leaks in smelting furnaces (2; 4) or in metal or alloy treatment plants, comprising the following steps: (i) providing at least one smelting furnace (2; 4), or at least one metal or alloy treatment plant provided with a water cooling system (5) and (Continued)

being connected to a process fume exhaust system; (ii) mixing in the cooling water a tracer chemical which is volatile in the event of water leakage together with the exhaust gases and which is suitable to be detected by an analysis system of the exhaust gases; and (iii) detecting said tracer chemical contained in the exhaust gases by said analysis system comprised in said process fume exhaust plant, wherein said tracer chemical is deuterated water. The invention further refers to a Plant for the production of metals or alloys.

13 Claims, 2 Drawing Sheets

(51) Int. Cl.
*F27D 9/00* (2006.01)
*F27D 21/00* (2006.01)

(52) U.S. Cl.
CPC .. *C21B 2100/00* (2013.01); *F27D 2009/0013* (2013.01)

(58) Field of Classification Search
CPC ....... G01M 3/226; G01M 3/228; C21B 13/12; C21B 2100/00; F27D 9/00
See application file for complete search history.

(56) References Cited

U.S. PATENT DOCUMENTS

| | | | |
|---|---|---|---|
| 9,651,447 B1 * | 5/2017 | Gaw | G01T 1/18 |
| 2013/0206358 A1 | 8/2013 | Maddalena et al. | |
| 2015/0184943 A1 | 7/2015 | Abel et al. | |

FOREIGN PATENT DOCUMENTS

| | | | | |
|---|---|---|---|---|
| JP | 2003139473 A | * | 5/2003 | C21C 5/005 |
| JP | 2003279435 A | | 10/2003 | |
| NL | 1002377 C2 | | 8/1997 | |
| RU | 2226219 | | 3/2004 | |
| SU | 996447 | | 2/1983 | |
| WO | WO-0196852 A1 | * | 12/2001 | G01N 27/622 |

OTHER PUBLICATIONS

"International Application No. PCT/IB2020/060402, International Search Report dated Jan. 21, 2021", (Jan. 21, 2021), 4 pgs.

"International Application No. PCT/IB2020/060402, Written Opinion dated Jan. 21, 2021", (Jan. 21, 2021), 7 pgs.

"Chinese Application Serial No. 202080076978.X, Office Action mailed Feb. 8, 2023", w English Translation, 17 pgs.

* cited by examiner

STATE OF THE ART

STATE OF THE ART

PROCESS FOR DETECTING WATER LEAKS FROM SMELTING FURNACES IN METAL OR ALLOY PRODUCTION PLANTS AND RELATED PLANT

PRIORITY APPLICATIONS

This application is a U.S. National Stage Filing under 35 U.S.C. 371 from International Application No. PCT/IB2020/060402, filed on Nov. 5, 2020, and published as WO2021/090222 on May 14, 2021, which claims the benefit of priority to Italian Application No. 102019000020470, filed on Nov. 6, 2019; the benefit of priority of each of which is hereby claimed herein, and which applications and publication are hereby incorporated herein by reference in their entireties.

TECHNICAL FIELD

The invention relates to a process for detecting water leaks in smelting furnaces for the production of metals or alloys, such as steel, cast iron, copper; in particular it is adapted to be used in electric arc furnaces, which are provided with a water cooling system and connected to a process fume extraction and exhaust system. More specifically, the process is suitable in the case of indirect cooling in which water flows inside a cooling circuit comprising related cooling panels. The described process and a related plant can also be used in other applications which provide a cooling circuit, for example in machines for vacuum treatment (degassing) of steel such as VD (Vacuum Degassing) or VDO (Vacuum Oxygen Degassing) plants.

BACKGROUND ART

It is known in the state of the art that electric furnaces require high amounts of water for the cooling of some of their parts: these cooling flows can easily reach hundreds of litres per minute. In this case, any leaks are immediately detectable by flow meters installed in the fluid supply lines which, however, must read high transiting amounts and do not have high sensitivity. Conversely, since the very first installations of $H_2O$-fed cooling panels inside electric furnaces, the problem of detecting minor water leaks has been highlighted. To date, in fact, there is still no safe and reliable method on the market to track microleaks of around tens of litres per minute. The consequences and damage caused by the leaks of the cooling panels are varied and range from damage to the refractors, with the risk of perforation of the vat, to the increase in the energy consumption of the furnace, to the risk of explosion due to the violent evaporation of water and, sometimes, due to the cleavage of the $H_2O$ molecule, the generation of $H_2$ and its explosion when the composition and temperature conditions are created which fall within the explosive limits of the $H_2/O_2$ oxyhydrogen mixtures. The document NL 1 002 377 C2 proposes a method for detecting water leaks from smelting furnace cooling systems by means of the addition of a tracer, in particular a noble gas, to the cooling fluid.

DISCLOSURE OF THE INVENTION

The object of the invention is to overcome the aforementioned drawbacks and to propose a process and a related plant for detecting water leaks from electric furnaces, in order to detect the presence of even minor leaks, allowing the furnace to be promptly stopped for repairs and thus avoiding damage to plants and people.

The object is achieved by a process for detecting water leaks in smelting furnaces, refining furnaces or in metal or alloy treatment plants, such as degassing plants, comprising the following steps:

(i) providing at least one smelting furnace, in particular an electric arc furnace, or at least one metal or alloy treatment plant provided with a water cooling system and connected to a process fume exhaust system;

(ii) mixing in the cooling water a tracer chemical which is volatile in the event of water leakage together with the exhaust gases from the smelting furnace or metal or alloy treatment plant and which is suitable to be detected by an analysis system of the exhaust gases produced in said at least one smelting furnace or in said at least one metal or alloy treatment plant; and (iii) detecting said tracer chemical contained in the exhaust gases by means of said analysis system comprised in said process fume exhaust plant.

The inventive concept therefore includes mixing, in the cooling water, a tracer chemical which in the event of water leakage from the cooling circuit is easily detectable by an analysis system, which can sample the exhaust gases output from the furnace or metal or alloy treatment plant and which is arranged downstream of the outlet of the furnace or metal or alloy treatment plant. A tracer which evaporates together with the "lost" cooling water is a sure indicator of the presence of the water itself inside the vat of the furnace. Obviously this chemical, which may be an element or a compound, is inserted in a suitable concentration inside the cooling water, but advantageously is absent or rarely concentrated in the normal cooling water or found in the smelting furnace or metal or alloy treatment plant. Advantageously, in addition to being volatile and easily detectable, the tracer does not disperse or degrade over time. Preferably, the tracer is a liquid which is completely miscible in the cooling water.

Different types of tracers are possible, for example the possibility of using a gaseous tracer has been tested, such as helium (He), but this option is not easily feasible due to the low solubility of this gas in the cooling water, with the consequent risk of worsening the thermal exchange. Other gases such as crypto (Kr) and xenon (Xe) are conceivable, but have the problems illustrated for helium (He).

In the production of metals, in particular steel, various types of electric furnaces or metal treatment plants are used which have cooling systems subject to potential water losses, such as ladle furnaces (LF) or electric arc furnaces (EAF) or steel degassing machines such as VD (Vacuum Degassing) or VOD (Vacuum Oxygen Degassing) systems. In a variant of the invention, the cooling system comprises cooling panels provided with water pipes. In particular, the electric arc furnace is subject to water losses due to the numerous cooling panels constituting its side walls and vault.

In a particularly preferred variant of the invention, the tracer chemical used is deuterated water. Deuterated water may be present in the form of $D_2O$ or HDO. Through exchange reactions, HDO forms an equilibrium with $H_2O$ and $D_2O$.

The proposed solution is surprising for its simplicity and does not cause any variation in the thermal exchange properties of the water panels.

The fluid selected as tracer is $D_2O$ (heavy water), containing deuterium (hydrogen isotope with mass 2) instead of hydrogen. Heavy water is non-toxic at the concentrations deemed necessary for the implementation of the invention and is completely miscible in $H_2O$ at any concentration. The technology disclosed here according to the invention allows the detection of tracers present only in traces, avoiding high costs for the tracers.

A preferred embodiment of the invention provides that the cooling system is a closed circuit system. A closed circuit avoids high tracer consumption, since it will only be located in said circuit (unless the quota evaporates in case of leaks). However, it is also possible to use the tracer in an open type cooling circuit, i.e., a circuit in which once the water has performed its function, it is sent to collection tanks, often open, used to also receive water from other users. In this case, however, a continuous tracer refill is necessary near the user for which the leaks are to be detected, since it is dispersed/diluted in the collection tanks. In this case the tracer liquid can be supplied also only for occasional checks.

The proposed solution is applied in a preferred form to the circuit feeding the cooling water to the panels and to the vault of the electric furnace.

For the detection of traces of $D_2O$ in water, and therefore in exhaust gases/fumes, mass spectrometry is particularly suitable. An increase in the concentration of $D_2O$ in exhaust gases or fumes in case of water leakage can be detected by means of a mass spectrometer. The spectrometer in this regard may be connected for example by means of an extraction probe to the exhaust gas vein downstream of the aspiration from the smelting furnace or from the metal or alloy treatment plant. Other analytical technologies, such as Nuclear Magnetic Resonance (NMR), require a powerful magnetic field and are not suitable for industrial applications.

When using mass spectrometry for detecting $D_2O$ in the leakage water, the optimum concentration of $D_2O$ to be considered in the water circuit shall take into account the following information: Normally used mains water contains a small natural concentration of $D_2O$ equal to its isotopic concentration, i.e., approximately 150 ppm. For spectrometric analysis it is possible to work both on the peak at 20 amu and, preferably on that at 19 amu, since for low concentrations, the natural isotopic balance of water includes the recombination of the molecules to give HDO in a higher concentration than that of $D_2O$. Alternatively, the use of the mass peak 4 ($D_2$) can be considered, which is highlighted by the mass spectrometer, but which also coincides with the peak of the helium element present in air with a concentration of about 5 ppm. The concentration of $D_2O$ to be reached in the exhaust gases and fumes, in order to have a response beyond doubt from the analysis system, must advantageously be greater than 25 ppm.

Those skilled in the art, simulating various amounts of water leakage and knowing the flow rates of the fumes involved in the process fume exhaust system and the volumes of cooling water, with their general knowledge and performing routine tests, are easily able to calculate the necessary amount of deuterated water to be added to the cooling water in order to detect any leakage with the process and plant according to the invention.

In order to show a concentration of about 25 ppm of $D_2O$ in the exhaust gases (whereas, without using $D_2O$, its concentration in the fumes would be a few ppm, not sufficient to obtain a reliable measurement) in plants of usual size and with a water loss of around 250 ml/s, preferably 0.15% by weight of $D_2O$ of the total mass of the water should be added to the cooling water circuit in exemplary form.

Advantageously, the process fume gas exhaust plant comprises at least one deduster device of the fumes output from the furnace and preferably an exhaust gas cooling device. In this case, the analysis system is located downstream of this/these device(s). Advantageously, the cooling device does not cause the condensation of $H_2O$ and the cooling does not take place by means of scrubbers or similar systems to avoid the loss of the tracer. The particle-free and cooled gas is ready to be sampled with a probe without blocking the capillary of the probe.

A further aspect of the invention relates to a plant for the production of metals or alloys comprising:
(a) at least one smelting furnace, in particular an electric arc furnace, or at least one metal or alloy treatment plant, provided with a water cooling system; and
(b) a process fume exhaust system adapted to extract and remove the exhaust gases produced by said at least one smelting furnace or by said metal or alloy treatment plant; characterized in that
(c) said cooling water is admixed with a tracer chemical which is volatile together with the exhaust gases from the smelting furnace or metal or alloy treatment plant, and is adapted to be detected in the exhaust gases produced in said at least one smelting furnace or in said metal or alloy treatment plant by an analysis system; and
(d) said analysis system is located in said process fume exhaust system.

The features described for one aspect of the invention may be transferred mutatis mutandis to the other aspects of the invention. This applies in particular to the tracer in the form of $D_2O$, its detection with a mass spectrometer, the use of a closed circuit for the cooling water, and the arrangement of the analysis system in the process fumes exhaust system downstream of a deduster device, and preferably after the cooling of the exhaust gases.

Generally it can be said that for plants of usual size, in order to implement the invention, it is advisable that the closed circuit of cooling $H_2O$ contains at least 0.1% by mass of $D_2O$. To return to the example in FIG. 1 above, the concentration of $D_2O$ to be added also depends on the analysis point which may be on the aforementioned primary branch of the fumes or directly on the stack which receives the exhaust gases from both branches.

An alarm system may be provided which, in the event of exceeding the maximum concentration set for the $D_2O$ and therefore indirectly for water leaks, warns the user and/or switches off the furnace.

The proposed method is applicable, even outside the metallurgical context, to any system provided with water cooling in the sense of the invention, which may be subject to water leakage and to any system provided with a plant for the exhaust of process fumes/gases.

The variants of the invention described reach the objects of the invention. In particular, they allow the determination of microleaks of water from the cooling circuits present in smelting furnaces, in particular in electric furnaces.

In practice, the materials employed, as well as the dimensions, numbers and shapes, provided that they are compatible with the specific and not otherwise specified use, may be different, according to requirements. In addition, all the details can be replaced by other technically equivalent elements.

Said objects and advantages will be further highlighted during the description of preferred embodiment examples of the invention given by way of example and not of limitation.

Variant embodiments of the invention are the object of the dependent claims. The description of the preferred exemplary embodiments of the process and the plant according to the invention is given by way of example and not of limitation, with reference to the attached drawings.

DESCRIPTION OF PREFERRED EMBODIMENT EXAMPLES

FIG. 1 illustrates a steel production plant and the relative fume extraction system according to the invention.

FIG. 2 schematically illustrates a prior art electric arc furnace to which the inventive concept is applicable.

Figure 1:
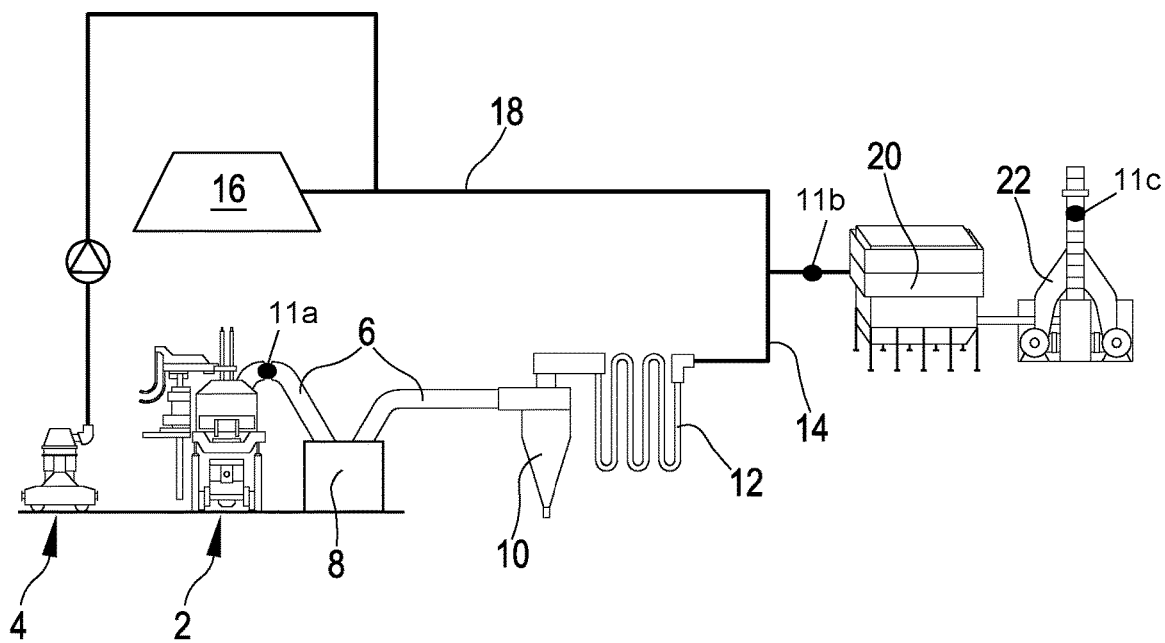

FIG. 1 illustrates a steel production plant according to the invention. The plant depicted is composed of two furnaces, an electric arc smelting furnace 2 and a ladle furnace 4 for refining treatments. The exhaust gases produced inside the arc furnace 2 are extracted from a fume extraction system, which can comprise the most varied treatment element components in various combinations and sizes, ranging from different forms of cooling of the fumes or exhaust gases, to different types of separators of solid and liquid components from the fumes, such as hoods, filters, cyclones, combustion devices, sedimentation chambers. Other typical elements of such plants are valves and fans to direct the flows.

In an exemplary form the fume system line is composed of a cooled conduit 6 which includes a sedimentation chamber 8 which removes heavy particles while cooling the fumes. Downstream of this chamber is a cyclone 10 for extracting further dust from the exhaust gases, which subsequently pass through a heat exchanger 12. This exhaust gas line deriving directly from the inside of the electric arc furnace 2 is the primary branch 14 of the plant and contains any water deriving from leaks in the faulty cooling panels of the electric furnace. The exhaust gases exiting the ladle furnace 4 and the gases extracted by a hood 16 above the electric arc furnace 2 comprise any water leaks outside the arc furnace 2 and deriving from the cooled and panelled vault of the ladle furnace 4 and form the secondary branch 18 of the exhaust gas plant of the steel production plant. The primary branch 14 and the secondary branch 18 join and the total exhaust gases are conveyed through a sleeve filter 20 to further purify the gas and then exit the plant through a stack 22. The entire extraction line is under vacuum by fans generally arranged at the base of the stack, which have the task of extracting the fumes. As mentioned, the plant depicted is only one example of a plant comprising an electric furnace in which the present invention can be applied and in which the analysis system can be integrated at various points to determine the presence of tracer added to the cooling water detectable in the exhaust gases in case of water leakage. The analysis system can preferably be located in the flue of the stack 22 (variant 11c), but alternatively also in the primary branch 14, clearly downstream of the electric arc furnace 2, such as for example immediately after the electric furnace (variant 11a) or before the filter 20 (variant 11b). If only the cooling water of the arc furnace 2 is provided with additional $D_2O$, but not the cooling water of the ladle furnace 4, a detection of the tracer is a sure indication of a leak in the arc furnace 2.

A steel production plant may comprise one or more furnaces or different types of furnaces in various combinations. If it is necessary to determine any water leakage in their respective cooling circuits, it is sufficient to arrange one or more analysers in the section of the fumes extraction system downstream of each furnace of interest (namely one for each furnace provided with deuterated water). To detect water leaks from the ladle furnace 4, it is advisable to have an analysis system (not shown) in the line 18 before encountering other lines which could contain tracers deriving from water leaks which do not derive from the ladle furnace 4. Usually the detection of leaks from the arc furnace 2 is of the most interest, and only the cooling water of this furnace is admixed with a tracer. In this case the analysis system can be arranged in the stack 22 (variant 11c) after the joining of the two branches 18 and 14 since the tracer can only derive from the arc furnace 2. If both arc furnace 2 and ladle furnace 4 leakage are to be monitored, two separate analysis systems must be provided downstream of the respective furnace before the related exhaust fume/gas lines meet.

The invention is applicable to all variants of process fume exhaust systems and combinations of furnaces mentioned above, with the only variation being the need to adapt the amount of tracer added to the size of the plant and the position of the analysis system and include a positioning of analysers at the appropriate points.

Figure 2:
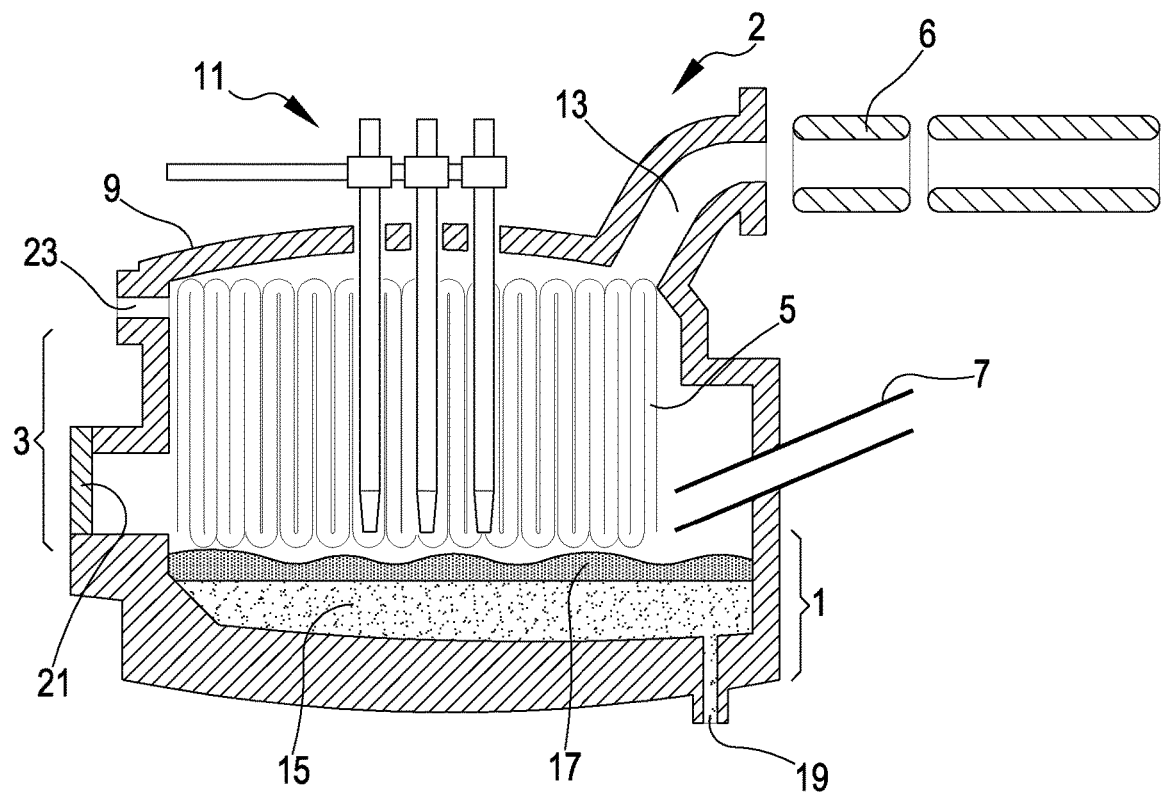

FIG. 2 schematically illustrates a prior art electric arc furnace 2 to which the inventive concept is applicable. A furnace as depicted is divided into a lower part 1 with the bottom and the vat for collecting the molten metal 15 covered by slag 17 and an upper part 3 covered with cooling panels 5 and covered by a panelled vault 9, which are often subject to water leakage from the respective cooling panels. The wall of the upper vat 3 has openings through which injectors 7 can be inserted to provide oxygen (for combustion), coal, lime and auxiliary fusion materials and to confer certain chemical, mechanical or physical features to the metal produced. An electric arc is produced with the electrodes 11 which melts the metal. The exhaust gases or fumes can be extracted from the furnace through an extraction mouth 13, which are then extracted by a pipe 6. The molten metal can instead be discharged from a hole 19 in the bottom of the furnace 2. The furnace can tilt on curved racks (not shown), to the right to spill through the hole 19, to the left to output the excess slag from the slag door 21. For scrap loading in general (in the case of basket feeding) the vault 9 opens, moving sideways around a pin. Alternatively, another side door (not shown) is arranged in the middle between the door 21 and the hole 19 for feeding scrap by means of a so-called continuous loading conveyor belt.

There may be traces of water in the furnace, usually deriving from the humidity of the loaded material, the humidity of air, and the water sprays which cool the electrodes, however according to the invention only the water leaks coming from the cooling panels are provided with deuterium concentrations greater than the natural concentration, the $D_2O$ being added only to the water fed to the cooled panels.

Figure 3:
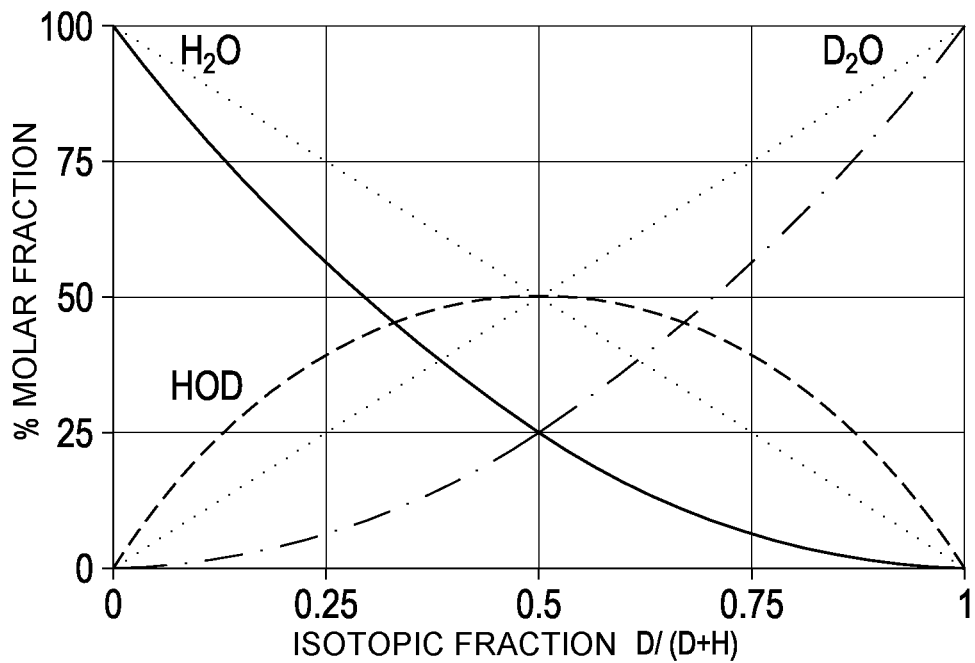
FIG. 3 illustrates in a graph (molar fractions of $H_2O$, $D_2O$ and HDO as a function of the isotopic fraction D/(D+H)) the exchange equilibrium between $H_2O/D_2O$ and HDO.

FIG. 3 illustrates in a graph (molar fractions of $H_2O$, $D_2O$ and HDO as a function of the isotopic fraction D/(D+H)) the exchange equilibrium between $H_2O/D_2O$ and HDO. Due to this equilibrium, the concentration of HDO in the concentration range concerned is higher than the concentration of $D_2O$ and it is therefore preferable to measure the peak of HDO (19) instead of $D_2O$ (20).

The mass spectrometer measures the mass of atoms or molecules. In this regard, the gaseous material to be analysed is inserted into an empty ionization chamber. An accelerated electron beam transforms what is introduced into positive ions which are pushed out of the chamber by an intense electric field. The speed reached by the ions depends on the mass, the lighter ions precisely reaching higher speeds than the heavy ones. In passing through a magnetic field, each ion deviates from its original trajectory because of its velocity and thus its mass. The magnetic field strength is slightly varied and a signal is obtained when the field is strong enough to deflect the ion beam enough to direct it into the detector. The mass of the ion type formed is calculated based on the accelerating voltage and magnetic field strength applied to obtain the signal. The mass spectrum is the diagram of the signal detected as a function of the magnetic field. The position of the peaks is used to calculate the mass of the accelerated ions, while their relative height indicates the proportion of the various types of ions. Mass spectrometers are known in the art and need not be described in more detail. The market offers a wide range of instruments useful for this purpose. Suitable spectrometers are for example systems for continuous smoke and steam analysis based on a mass spectrometer with a quadrupole mass analyser with a double detection system: SEM (secondary electron multiplier) and Faraday. The mass range is 0 to 50 amu (atomic mass unit) with a sensitivity of 100% at 100 ppb. The speed is advantageously more than 500 measurements per second and the response time <300 ms. An ultra high vacuum (UHV) turbomolecular pump with a flow rate of 60 l/s with an integrated membrane pump for sample foreline and bypass-type pumping can be provided as a vacuum system. The inlet for the capillary gas sampling is suitable for continuous sampling with a sample pressure between 100 mbar and 2 bar. Components may be a molecular leak manifold bypass, a 2 metre long heated quartz capillary sampling line, an inlet heating system ranging from room temperature to 200° C., and a bypass pumping line with a sample bypass control valve.

The measurement system can be improved by reducing system vibrations, minimizing cold spots, optimizing capillary diameter and the dilution of fumes or exhaust gases.

To demonstrate the functionality of the principle of the invention, in a system as depicted in FIG. 1, injections of deuterated water were carried out within the furnace and the sedimentation chamber at various concentrations and at various frequencies in a limited period of time.

Figure 4:
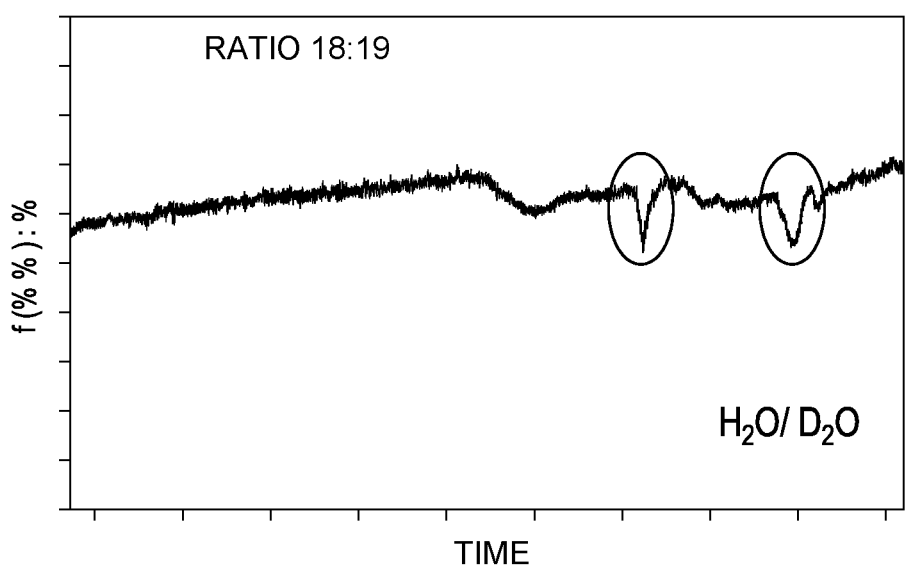
FIG. 4 illustrates the detection of traces of $D_2O$ for the ratio 18:19 of the atomic mass for a simulation of water leakage.

FIG. 4 illustrates in exemplary form the detection of traces of $D_2O$ for the ratio 18 amu:19 amu for a simulation of water leakage with two injections within one minute. The diagram clearly distinguishes two peaks spaced apart over time, which correspond to the two injections made and express the variation in the $H_2O/D_2O$ ratio caused by the presence of high concentrations of $D_2O$. The graph shows a temporary simulation of leaks, in the case of continuous leaks the trend detected would obviously be different.

During operation further embodiment modifications or variants of the process and the plant object of the invention may be implemented. If such modifications or such variants should fall within the scope of the following claims, they should all be considered protected by the present patent.

The invention claimed is:

1. A process for detecting water leaks in smelting furnaces or in metal or alloy treatment plants, comprising the following steps:
    (i) providing at least one smelting furnace, or at least one metal or alloy treatment plant provided with a water cooling system and connected to a process fume exhaust system;
    (ii) mixing in the cooling water a tracer chemical which is volatile in the event of water leakage together with the exhaust gases from the smelting furnace or metal or alloy treatment plant and which is suitable to be detected by an analysis system of the exhaust gases produced in said at least one smelting furnace or in said at least one metal or alloy treatment plant; and
    (iii) detecting said tracer chemical contained in the exhaust gases by said analysis system comprised in said process fume exhaust system,
    wherein said tracer chemical is deuterated water and
    wherein said analysis system is a mass spectrometer.

2. The process according to claim 1, wherein said cooling system is a closed circuit system.

3. The process according to claim 2, wherein said closed circuit of cooling $H_2O$ contains at least 0.1% by mass of $D_2O$.

4. The process according to claim 1, wherein said cooling system comprises cooling panels provided with water pipes.

5. The process according to claim 1, wherein said process fume exhaust plant comprises at least one deduster device and that said analysis system is located downstream of the device.

6. The process according to claim 5, wherein said process fume exhaust plant further comprises an exhaust gas cooling device.

7. The process according to claim 1, wherein the at least one smelting furnace is an electric arc furnace.

8. A plant for the production of metals or alloys comprising:
    (a) at least one smelting furnace, or at least one metal or alloy treatment plant, provided with a water cooling system; and
    (b) a process fume exhaust plant adapted to extract and remove the exhaust gases produced by said at least one smelting furnace or by said metal or alloy treatment plant;
    wherein
    (c) said cooling water is admixed with a tracer chemical, which is deuterated water, which is volatile together with the exhaust gases from the smelting furnace or metal or alloy treatment plant, and is adapted to be detected in the exhaust gases produced in said at least one smelting furnace or in said metal or alloy treatment plant by an analysis system; and
    (d) said analysis system is located in said process fume exhaust plant
    wherein said analysis system is a mass spectrometer.

9. The plant according to claim 8, wherein said cooling system comprises cooling panels provided with water pipes.

10. The plant according to claim 8, wherein said process fume exhaust plant comprises at least one deduster device and that said analysis system is located downstream of this/these device(s).

11. The process according to claim 10, wherein said process fume exhaust plant further comprises an exhaust gas cooling device.

12. The process according to claim 8, wherein the at least one smelting furnace is an electric arc furnace.

13. The process according to claim 8, wherein the cooling system is a closed circuit system.

* * * * *